US007178049B2

(12) United States Patent
Lutter (10) Patent No.: US 7,178,049 B2
(45) Date of Patent: Feb. 13, 2007

(54) METHOD FOR MULTI-TASKING MULTIPLE JAVA VIRTUAL MACHINES IN A SECURE ENVIRONMENT

(75) Inventor: Robert Pierce Lutter, Tacoma, WA (US)

(73) Assignee: Medius, Inc., Bainbridge Island, WA (US)

( * ) Notice: Subject to any disclaimer, the term of this patent is extended or adjusted under 35 U.S.C. 154(b) by 449 days.

(21) Appl. No.: 10/132,886

(22) Filed: Apr. 24, 2002

(65) Prior Publication Data

US 2003/0204550 A1 Oct. 30, 2003

(51) Int. Cl.
*G06F 11/00* (2006.01)
(52) U.S. Cl. ............................ 714/1; 718/100
(58) Field of Classification Search ........ 718/100–103, 718/1, 104, 106–107; 714/1–3, 10, 13
See application file for complete search history.

(56) References Cited

U.S. PATENT DOCUMENTS

| 4,591,976 | A | * | 5/1986 | Webber et al. ............ 714/20 |
| 5,111,401 | A | * | 5/1992 | Everett et al. ............ 701/24 |
| 5,506,963 | A | * | 4/1996 | Ducateau et al. ........ 718/108 |
| 6,061,709 | A | * | 5/2000 | Bronte ..................... 718/103 |
| 6,128,608 | A | * | 10/2000 | Barnhill ................. 706/16 |
| 6,167,253 | A | * | 12/2000 | Farris et al. .......... 455/412.2 |
| 6,243,450 | B1 | | 6/2001 | Jansen et al. |
| 6,374,286 | B1 | * | 4/2002 | Gee et al. ................ 718/108 |
| 2002/0012329 | A1 | * | 1/2002 | Atkinson et al. ........ 370/330 |
| 2002/0087886 | A1 | * | 7/2002 | Ellis ..................... 713/201 |
| 2002/0144010 | A1 | * | 10/2002 | Younis et al. ............ 709/314 |
| 2002/0198925 | A1 | * | 12/2002 | Smith et al. ............. 709/104 |
| 2003/0065432 | A1 | * | 4/2003 | Shuman et al. ........... 701/48 |
| 2003/0110113 | A1 | * | 6/2003 | Martin .................. 705/36 |
| 2003/0201365 | A1 | * | 10/2003 | Nelson ................ 244/118.5 |

FOREIGN PATENT DOCUMENTS

| WO | WO96/24229 | 8/1996 |
| WO | WO99/08436 | 2/1999 |
| WO | WO99/57662 | 11/1999 |
| WO | WO99/65183 | 12/1999 |
| WO | WO01/30061 | 4/2001 |
| WO | WO01/58110 | 8/2001 |

OTHER PUBLICATIONS

Luttge, Karsten; "E-Charging API: Outsource Charging to a Payment Service Provider"; IEEE; 2001 (pp. 216-222).
Product description of Raytheon RT Secure, "Embedded Hard Real-Time Secure Operating System", Copyright 2000, pp. 1-2.

(Continued)

*Primary Examiner*—Dieu-Minh Le
(74) *Attorney, Agent, or Firm*—Marger Johnson & McCollom, P.C.

(57) ABSTRACT

The present invention allows construction of a secure, real-time operating system from a portable language such as Java that appears to be a Java virtual machine from a top perspective but provides a secure operating system from a bottom perspective. This allows portable languages, such as Java, to be used for secure embedded multiprocessor environments.

40 Claims, 5 Drawing Sheets

OTHER PUBLICATIONS

Product description of Raytheon RT Secure, Copyright 2001, pp. 1-2.

Product description of Raytheon RT Secure, "Development Environment", Copyright 2001, pp. 1-2.

Product description of Raytheon Electronic Systems (ES), Copyright 2002, pp. 1-2.

H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, pp. 1-6.

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13.

J. Takezaki, N. Ueki, T. Minowa, H. Kondoh, "Support System for Safe Driving —A Step Toward ITS Autonomous Driving —", Hitachi Review, vol. 49, No. 3, 2000, pp. 1-8.

S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.

M. Chantler, G. Russel, and R. Dunbar, "Probabilistic Sensor Fusion for Reliable Workspace Sensing", pp. 1-14.

ISIS Project: Sensor Fusion, Linkoping University Division of Automatic Control and Communication Systems in cooperating with SAAB (Dynamics and Aircraft), 18 pages.

Hitachi Automated Highway System (AHS), Automotive Products, Hitachi, Ltd., Copyright 1994-2002, 8 pages.

Vehicle Dynamics Lab, University of California, Berkeley, funded by BMW, current members: D. Caveney and B. Feldman, "Adaptive Cruise Control", 17 pages.

Counterair: The Cutting Edge, Ch. 2 "The Evolutionary Trajectory The Fighter Pilot-Here to Stay?" AF2025 v3c8-2, Dec. 1996, pp. 1-7.

Counterair: The Cutting Edge, Ch. 4 "The Virtual Trajectory Air Superiority without an "Air" Force?" AF2025 v3c8-4, Dec. 1996, pp. 1-12.

TNO FEL Annual Review 1998: Quality works, 16 pages.

Boeing News Release, "Boeing Demonstrates JSF Avionics Multi-Sensor Fusion", Seattle, WA, May 9, 2000, pp. 1-2.

Boeing Statement, "Chairman and CEO Phil Condit on the JSF Decision", Washington, D.C., Oct. 26, 2001, pp. 1-2.

Ada 95 Transition Support- Lessons Learned, Sections, 3, 4, and 5, CACI, Inc. -Federal, Nov. 15, 1996, 14 pages.

Joint Strike Fighter Terrain Database, ets-news.com "Simulator Solutions" 2002, 3 pages.

MSRC Redacted Proposal, 3.0 Architecture Development, pp. 1-43.

Powerpoint Presentation by Robert Allen - Boeing Phantom Works entitled "Real-Time Embedded Avionics System Security and COTS Operating Systems", Open Group Real-Time Forum, Jul. 18, 2001, 16 pages.

Green Hills Software, Inc. "The AdaMULTI 2000 Integrated Development Environment", Copyright 2002, 7 pages.

\* cited by examiner

METHOD FOR MULTI-TASKING MULTIPLE JAVA VIRTUAL MACHINES IN A SECURE ENVIRONMENT

This application incorporates by reference U.S. patent application Ser. No. 09/841,753, filed Apr. 24, 2001, now U.S. Pat. No. 6,629,033 entitled: OPEN COMMUNICATION SYSTEM FOR REAL-TIME MULTIPROCESSOR APPLICATIONS and pending U.S. patent application Ser. No. 09/841,915, filed Apr. 24, 2001 entitled: METHOD AND APPARATUS FOR DYNAMIC CONFIGURATION OF MULTIPROCESSOR SYSTEM.

BACKGROUND OF THE INVENTION

Java is a robust, object-oriented programming language expressly designed for use in the distributed environment of the Internet. Java can be used to create complete applications that may run on a single computer or be distributed among servers and clients in a network. A source program in Java is compiled into byte code, which can be run anywhere in a network on a server or client that has a Java virtual machine (JVM).

A JVM describes software that is nothing more than an interface between the compiled byte code and the microprocessor or hardware platform that actually performs the program's instructions. Thus, the JVM makes it possible for Java application programs to be built that can run on any platform without having to be rewritten or recompiled by the programmer for each separate platform.

Jini is a distributed system based on the idea of federating groups of users and the resources required by those users. Resources can be implemented either as hardware devices, software programs, or a combination of the two. The Jini system extends the Java application environment from a single virtual machine to a network of machines. The Java application environment provides a good computing platform for distributed computing because both code and data can move from machine to machine. The Jini infrastructure provides mechanisms for devices, services, and users to join and detach from a network. Jini systems are more dynamic than is currently possible in networked groups where configuring a network is a centralized function done by hand.

However, the Java/Jini approach is not without its disadvantages. Both Java and Jini are free, open source applications. The Java application environment is not designed for controlling messaging between different machines. For example, the Java application is not concerned about the protocols between different hardware platforms. Jini has some built-in security that allows code to be downloaded and run from different machines in confidence. However, this limited security is insufficient for environments where it is necessary to further restrict code sharing or operation sharing among selected devices in a secure embedded system.

SUMMARY OF THE INVENTION

The present invention allows construction of a secure, real-time operating system from a portable language such as Java that appears to be a Java virtual machine from a top perspective but provides a secure operating system from a bottom perspective. This allows portable languages, such as Java, to be used for secure embedded multiprocessor environments.

The foregoing and other objects, features and advantages of the invention will become more readily apparent from the following detailed description of a preferred embodiment of the invention which proceeds with reference to the accompanying drawings.

DETAILED DESCRIPTION

Figure 1:
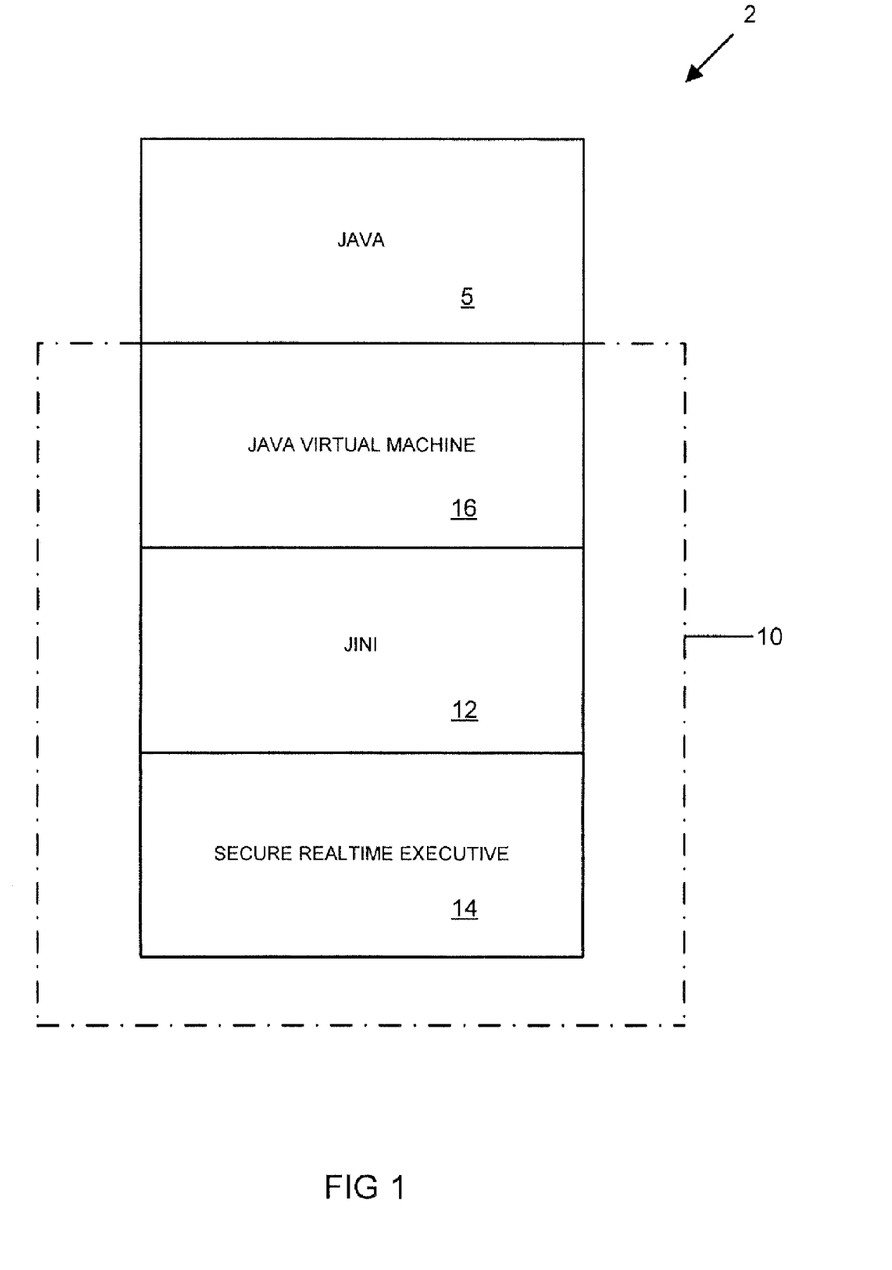
FIG. 1 is a diagram showing a java stack with an additional Secure Real-time Executive (SRE) layer.

A java application stack includes a Java layer 5 for running any one of multiple different applications. In one example, the applications are related to different vehicle operations such as Infrared (IR) and radar sensor control and monitoring, vehicle brake control, vehicle audio and video control, environmental control, driver assistance control, etc. A Java Virtual Machine (JVM) layer 16 provides the hardware independent platform for running the Java applications 5. A Jini layer 12 provides some limited security for the Java applications that run on different machines. However, the Jini layer 12 does not provide the necessary reconfiguration and security management necessary for a distributed real-time multiprocessor system.

A Secure Real-time Executive (SRE) 14 provides an extension to the JVM 16 and allows Java to run on different processors for real-time applications. The SRE 20 manages messaging, security, critical data, file I/O multiprocessor task control and watchdog tasks in the Java environment as described below. The JVM 16, Jini 12 and SRE 14 can all be implemented in the same JVM 10. However, for explanation purposes, the JVM 10 and the SRE 14 will be shown as separate elements.

Figure 2:
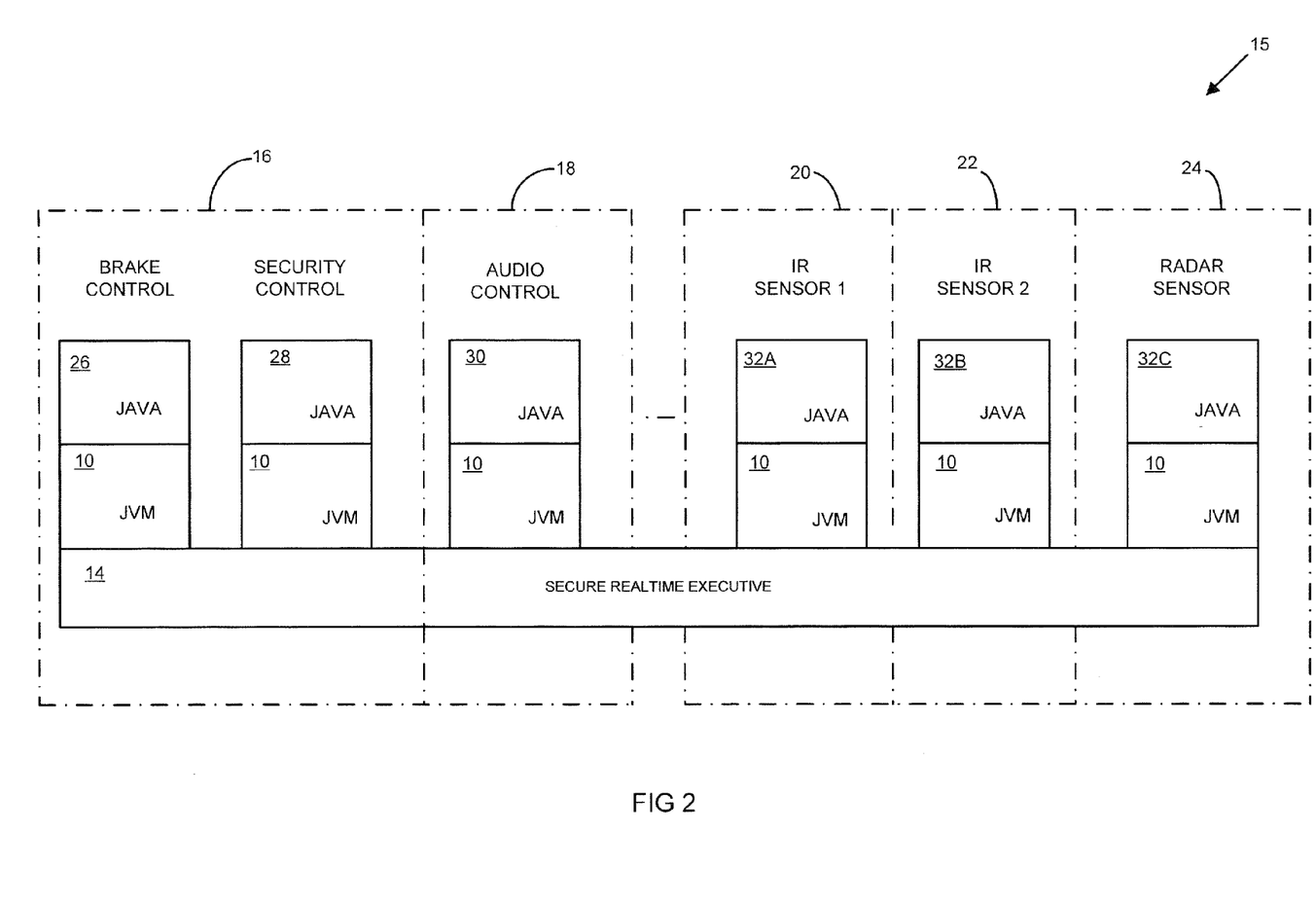
FIG. 2 is a diagram of a multiprocessor system that runs multiple Java Virtual Machines that each include a SRE.

FIG. 2 shows a system 15 that includes multiple processors 16, 18, 20, 22 and 24. Each processor includes one or more JVMs 10 that run different Java applications. For example, processor 16 includes one Java application 28 that controls a vehicle security system and another Java application 26 that controls the vehicles antilock brakes. A processor 18 includes a Java application 30 that controls audio sources in the vehicle. Other processors 20 and 22 may run different threads 32A and 32B for the same sensor fusion Java application 32 that monitors different IR sensors. Another thread 32C on processor 24 monitors a radar sensor for the sensor fusion Java application 32.

The SRE 14 runs below the JVMs 10 in each processor and control tasks, messaging, security, etc. For example, the Java application 26 controls vehicle braking according to the sensor data collected by the sensor fusion Java application 32. The SRE 14 in one example prevents unauthorized data from being loaded into the processor 16 that runs brake control application 26. The SRE 14 also prevents other Java applications that are allowed to be loaded into processor 16 from disrupting critical braking operations, or taking priority over the braking operations, performed by Java application 26.

For example, the SRE 14 may prevent noncritical vehicle applications, such as audio control, from being loaded onto processor 16. In another example, noncritical operations, such as security control application 28, are allowed to be loaded onto processor 16. However, the SRE 14 assigns the security messages low priority values that will only be processed when there are no braking tasks in application 26 that require processing by processor 16.

The SRE 14 allows any variety of real-time, mission critical, nonreal-time and nonmission critical Java applications to be loaded onto the multiprocessor system 15. The SRE 14 then automatically manages the different types of applications and messages to ensure that the critical vehicle applications are not corrupted and processed with the necessary priority. The SRE 14 is secure software that cannot be manipulated by other Java applications.

The SRE 14 provides priority preemption on a message scale across the entire system 15 and priority preemption on a task scale across the entire system 15. So the SRE 14 controls how the JVMs 10 talk to each other and controls how the JVMs 10 are started or initiated to perform tasks. The SRE 14 allows programmers to write applications using Java in a safe and secure real time environment. Thus, viruses can be prevented by SRE 14 from infiltrating the system 15.

While the explanation uses Java as one example of a programming environment where SRE 14 can be implemented, it should be understood that the SRE 14 can be integrated into any variety of different programming environments that may run in the same or different systems 15. For example, SRE 14 can be integrated into an Application Programmers Interface (API) for use with any programming language such as C++.

Figure 3:
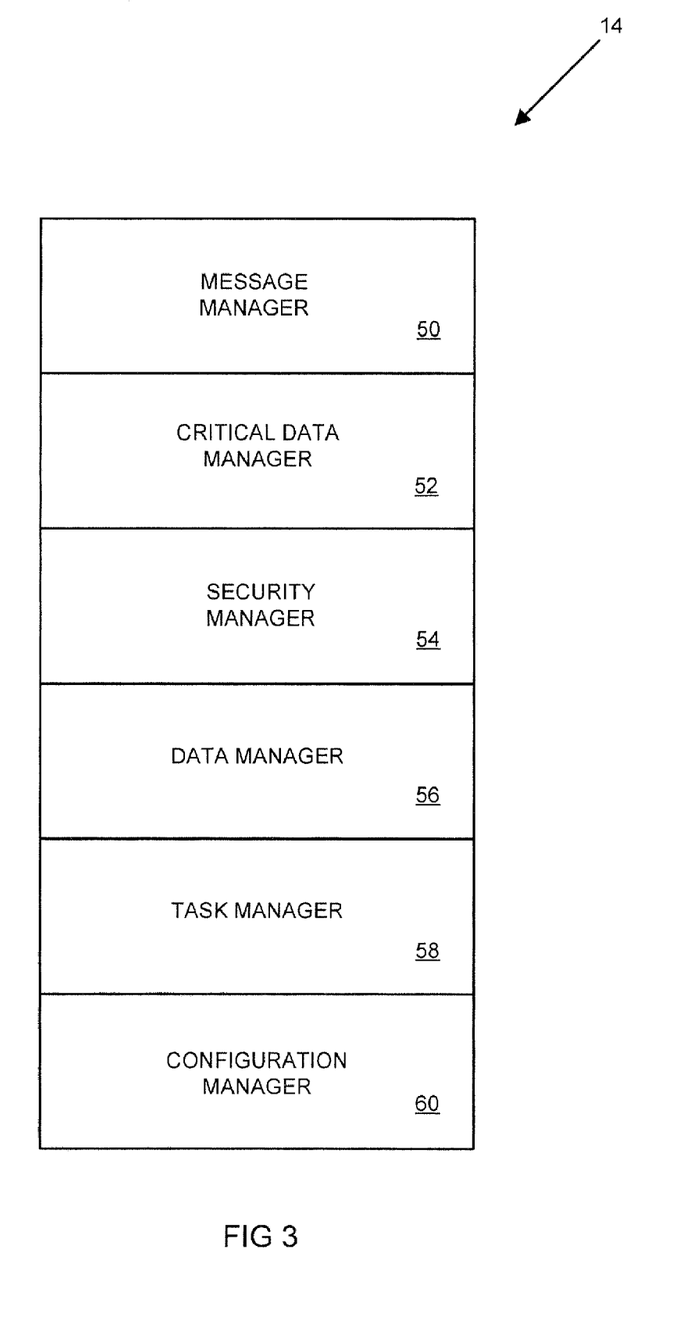
FIG. 3 is a detailed diagram of the managers in the SRE.

FIG. 3 shows the different functions that are performed by the SRE 14. Any combination of the functions described below can be provided in the SRE 14. A message manager 50 controls the order messages are received and transmitted by the different Java applications. A security manager 54 controls what data and messages are allowed to be received or transmitted by different Java applications. A critical data manager 52 controls what data is archived by the different Java applications.

A data manager 56 controls what data is allowed to be transferred between different processors. A task manager 58 controls the order tasks are performed by the different JVMs. A configuration manager 60 monitors the operation of the different processors in the system and reassigns or reconfigures Java applications and Java threads to different processors according to what processors have failed or what new processors and applications have been configured into system 15.

The message manager 50 partially corresponds to the priority manager 44 shown in FIG. 2 of U.S. Pat. No. 6,629,033, the critical data manager 52 partially corresponds with the logging manager 44 shown in FIG. 2 of the '033 patent, and the security manger 54 at least partially corresponds with the security manager 40 shown in the '033 patent. The data manager 56 at least partially corresponds with the data manager 42 shown in FIG. 2 of pending patent application Ser. No. 09/841,915, the task manager 58 partially corresponds to the device manager 46 shown in FIG. 2 of the '915 application, and the configuration manager 60 at least partially corresponds to the configuration manager 44 shown in FIG. 2 of the '915 patent application. The descriptions of how the different managers 50–60 operate similarly to the corresponding managers in the '033 patent and the '915 patent applications are herein incorporated by reference and are therefore not described in further detail.

However, some specific tasks performed by the managers 50–60 are described below in further detail.

Figure 4:
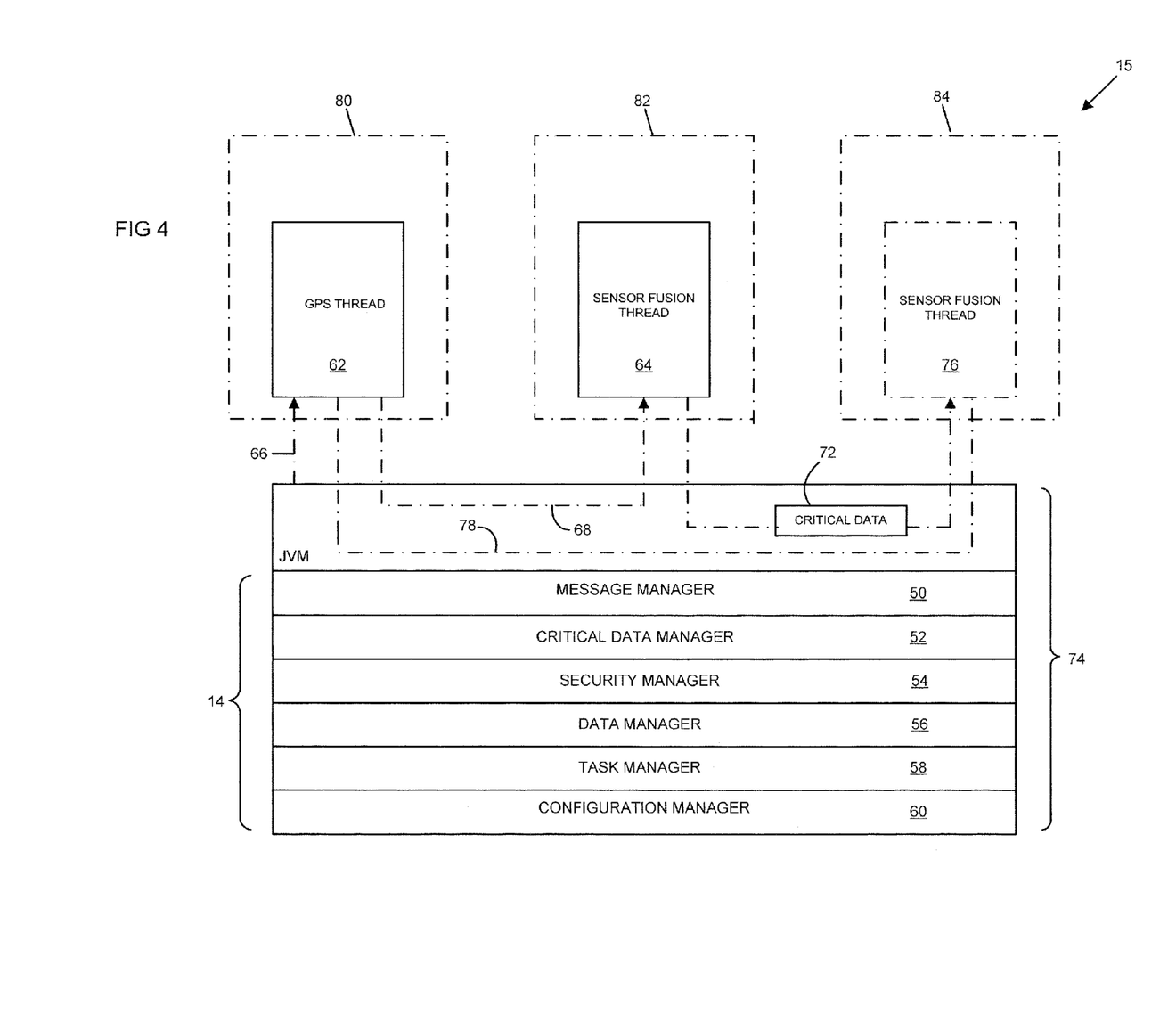
FIG. 4 is a block diagram of how the SRE manages a multiprocessor system.

FIG. 4 shows in more detail how the SRE 14 operates. One of the operations performed by the task manager 58 is to control when different tasks are initiated on different processors. For example, a first Global Positioning System (GPS) thread 62 is running on a JVM in a processor 80. Another sensor fusion thread 64 is running on a different processor 82. Block 74 represents the Java Virtual Machine operating in each of processors 80 and 82. A master JVM 74 may run on either processor 80, processor 82 or on some other processor.

The task manager 58 sends an initiation command 66 to the GPS thread 62 to obtain location data. The task manager 58 then directs the obtained GPS data 68 through a link to the sensor fusion thread 64 for subsequent processing of GPS data 68. The link may be any bus, such as a PCI bus, serial link such as a Universal Serial Bus, a wireless link such as blue tooth or IEEE 802.11, or a network link such as Ethernet, etc.

The configuration manager 60 acts as a watchdog to make sure that the GPS thread 62 and the sensor fusion thread 64 are each running correctly. In one example, separate configuration managers 60 in each processor 80 and 82 sends out periodic signals to the other configuration managers 60 in the other processors. Any one of the configuration managers 60 can detect a processor or application failure by not receiving the periodic "ok" signals from any one of the other processors for some period of time. If a failure is detected, then a particular master configuration manager 60 in one of the processors determines where the task in the failed processor is going to be reloaded. If the master configuration manager 60 dies, then some conventional priority scheme, such as round robin, is used to select another configuration master.

If a failure is detected, say in the processor 82 that is currently performing the sensor fusion thread 64, a message is sent from the configuration manager 60 notifying the task manager 58 which processor is reassigned the sensor fusion thread. In this example, another sensor fusion thread 76 in processor 84 is configured by the configuration manager 60.

The critical data manager 52 manages the retention of any critical data 72 that was previously generated by the sensor fusion thread 64. For example, the critical data manager 54 automatically stores certain data and state information that was currently being used in the sensor fusion thread 64. The critical data may include GPS readings for the last 10 minutes, sensor data obtained from sensors in other processors in the vehicle over the last 10 minutes. The critical data may also include any processed data generated by the sensor fusion thread 64 that identifies any critical vehicle conditions.

The critical data manager 52 also determines which data to archive generally for vehicle maintenance and accident reconstruction purposes.

The configuration manager 60 directs the critical data 72 to the new sensor fusion thread 76. The task manager 58 then redirects any new GPS data obtained by the GPS thread 78 to the new sensor fusion thread 76 and controls sensor fusion tasks from application 76. Thus, the configuration manager 60 and the task manager 58 dynamically control bow different Java threads are initialized, distributed and activated on different processors.

The message manager 50 determines the priority of sent and received messages. If the data transmitted and received by the sensor fusion thread 76 is higher priority than other data transmitted and received on the processor 84, then the sensor fusion data will be given priority over the other data. The task manager 58 controls the priority that the sensor fusion thread 76 is giving by processor 84. If the sensor fusion thread 76 has higher priority than, for example, an audio application that is also being run by processor 84, then the sensor fusion thread 76 will be performed before the audio application.

The SRE 14 can be implemented in any system that needs to be operated in a secure environment. For example, network servers or multiprocessors operating in a home environment. The multiprocessors in home appliances, such as washer and dryers, home computers, home security systems, home heating systems, can be networked together and operate Java applications. The SRE 14 prevents these multiple processors and the software that controls these processors from being corrupted by unauthorized software and also allows the applications on these different processors to operate as one integrated system.

The SRE 14 is a controlled trusted computing based that is not accessible by non-authorized application programmers and anyone in the general public. Therefore, the SRE 14 prevents backing or unauthorized control and access to the processors in the vehicle.

Task Controlled Applications

Debugging is a problem with multiprocessor systems. The task manager 58 allows the Java applications to be run in a lock-step mode to more effectively identify problems in the multiprocessor system 15.

Figure 5:
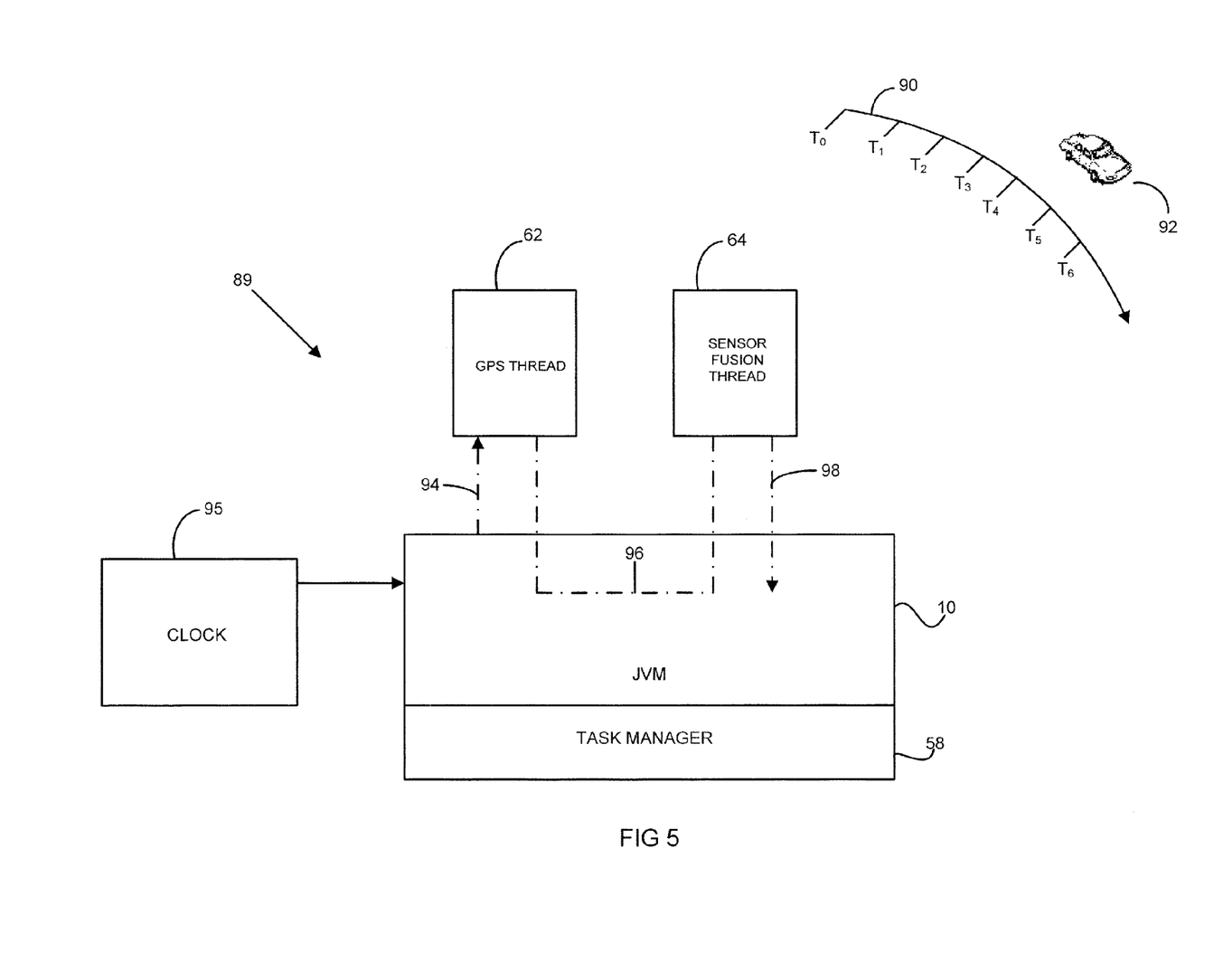
FIG. 5 is a bock diagram showing how a task manager in the SRE operates the multiprocessor system in a lock-step mode.

FIG. 5 shows a path 90 taken by a vehicle 92. In one application, the position of the vehicle 92 is sampled every second $t_1$, $t_2$, $t_3$, $t_4$ etc. The position of the vehicle 92 is sampled by a GPS receiver in vehicle 92 that reads a longitudinal and latitudinal position from a GPS satellite. The GPS receiver is controlled by the GPS thread 62 that receives the GPS data and then sends the GPS data to a sensor fusion thread 64 that may run on the same or a different processor in the vehicle 92. The sensor fusion thread 64 can perform any one of many different tasks based on the GPS data. For example, the sensor fusion thread 64 may update a map that is currently being displayed to the driver of vehicle 92 or generate a warning signal to the vehicle driver.

For each sample period $t_N$, the task manager 58 sends a request 94 to the GPS thread 62 to obtain GPS data. The task manager 58 uses a clock 95 as a reference for identifying each one second sample period. Each time a second passes according to clock 95, the task manager 58 sends out the request 94 that wakes up the GPS tread 62 to go read the GPS data from the GPS satellite. Once the GPS data has been received, the GPS thread 62 passes the GPS data 96 to the sensor fusion tread 64. The GPS thread 62 then goes back into an idle mode until it receives another activation command from the task manager 58.

The task manager 58 can control when the GPS thread 62 is woken up. Instead of the GPS thread 62 being free running, the GPS thread 62 is operating according to a perceived time controlled by the task manager 58. The task manager 58 may send the activation request 94 to the GPS thread 62 once every second during normal sensor fusion operation. When the system is in a debug mode, however, the task manager 58 may only send one activation command 94. This allows the other operations performed by the system 89 to be monitored and determine how the single sampling of GPS data 96 propagates through system 89. The task manager 58 may also delay or disable task initiation to other threads, so that the processing of the GPS data 96 can be isolated.

The task manager 58 can isolate any state in the overall system 89, such as the state of system 89 after a first GPS reading by GPS thread 62 or the state of system 89 after the thirty second GPS reading by GPS thread 62 by controlling when and how often activation commands 94 are sent to GPS thread 62. In a similar manner, the task manager 58 can control when other tasks are performed by the system 89, such as when the sensor fusion thread 64 is activated.

Thus, the task manager 58 controls when Java applications are activated effectively running the overall system 89 in a lock-step mode. The task manager 58 can control the initiation of multiple tasks at the same time. This allows the task manager to control what parameters and operations are performed and used by the different Java threads so that different states in the multiprocessor system 89 can be detected and monitored more effectively.

One application for the task controlled applications is for accident reconstruction. The critical data manager 52 (FIG. 3) may save different vehicle parameters from a vehicle that has been in an accident. For example, sensor data, brake data, speed data, etc. The task manager 58 can feed the saved data into the different Java applications in a lock-step mode to determine how each Java thread processes the saved data. This can then be used to identify any failures that may have occurred in the system 89.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A portable processing system for controlling operations in a vehicle, comprising:

multiple processors located in the vehicle that transmit and receive messages over a wired or wireless network located within the vehicle, the processors executing different vehicle applications associated with critical operations associated with primary vehicle functions used for driving and controlling the vehicle and non-critical operations associated with providing and controlling driver ergonomic functions not required for operating the primary vehicle driving and control functions;

at least one of the processors operating as an executive that dynamically initiates the execution of the applications on different processors according to processor availability and the critical and noncritical operations associated with the vehicle applications so that identified failure of at least one of the vehicle applications associated with one of the critical operations is automatically transferred to a selected at least one of the processors currently executing non-critical operations thereby dynamically reassigning the selected at least one of the processors as a backup processor for one or more of the processors executing critical operations.

2. A portable processing system according to claim 1 wherein the vehicle applications are implemented using a Java or C++ operating language.

3. A portable processing system according to claim 1 wherein the executive identifies failure of a first processor executing one of the vehicle applications associated with one of the critical operations and in response to the identified failure automatically initiating the vehicle application on a second processor that is executing an application associated with one of the non-critical operations.

4. A portable processing system according to claim 1 wherein the vehicle applications are used for controlling real-time vehicle braking, driving or object detection operations.

5. A portable processing system according to claim 4 wherein the non-critical operations include operation of a car stereo.

6. A portable processing system according to claim 1 wherein the executive assigns priority values to the messages according to the critical and non-critical operations sending and receiving the messages.

7. A portable processing system according to claim 6 wherein the executive assigns priority preemption to messages and tasks for controlling how different applications communicate with each other.

8. A portable processing system according to claim 1 wherein the executive automatically archives vehicle data during vehicle operation for use in accident reconstruction or vehicle maintenance.

9. A portable processing system according to claim 1 including:
a first processor operating a first critical operation;
a second processor operating one of the non-critical operations;
wherein the executive detects a failure of the first processor, or failure in the critical operation on the first processor; and
in response to the failure detection the executive identifying the second processor as available as a backup processor for running the critical operation and accordingly directing the second processor to start operating the first critical operation while transferring data obtained from the first processor while operating the first critical operation to the second processor such that the second processor operates one of the non-critical operations and also provides redundancy for the failed first critical operation.

10. A portable processing system according to claim 1 wherein the executive further includes a message manager configured to control how messages are received and transmitted between different vehicle applications operating on different processors.

11. A portable processing system according to claim 10 wherein the executive further includes a security manager configured to control what data and messages are allowed to be received and transmitted between the different vehicle applications operating on the different processors.

12. A portable processing system according to claim 11 wherein the security manager prevents non-critical operations and messages from non-critical operations from being loaded onto processors running critical operations.

13. A portable processing system according to claim 1 wherein the executive further comprises a critical data manager that identifies critical operations and periodically stores data associated with the identified critical operations.

14. A portable processing system according to claim 13 wherein the critical data manager manages the retention of data generated by a sensor fusion application operating on a first processor by transferring the data to a second processor that takes over operation of the sensor fusion application when a failure is identified with the first processor.

15. A portable processing system according to claim 1 wherein the multiple different processors each operate multiple different configuration managers and one of the configuration managers operates as a master configuration manager,
the multiple different configuration managers configured to periodically send operating signals and the master configuration manager reassigning vehicle applications associated with the processors that fail to periodically send the operating signals.

16. A portable processing system according to claim 15 wherein a priority scheme is used to dynamically reassign the master configuration manager to another processor when a failure is identified with the processor currently operating the master configuration manager.

17. A portable processing system according to claim 1 wherein one or more of the processors operate as a task manager, a configuration manager, and a critical data manager;
the task manager operating one or more sensors for capturing sensor data and then controlling transfer of the captured sensor data between the processors for subsequent processing;
the configuration manager monitoring communications between the processors to detect processor failures; and
the critical data manager retaining at least some of the sensor data and directing the retained sensor data and any new sensor data to the different processors according to any processor failures identified by the configuration manager.

18. An application management system comprising:
modular processors linked over a network for operating different vehicle applications that control or monitor associated critical and non-critical vehicle operations;
at least one of the processors operating as an executive that control which processors operate the applications according to the associated critical and non-critical vehicle operations and according to different vehicle conditions and priorities associated with data and messages exchanged between the processors, wherein the executive directs one of the processors operating one of the non-critical applications to take over operation for one of the critical applications when the processor operating the critical application fails; and
sensors that provide input to a primary processor or a backup processor according to instructions provided by the executive, wherein the backup processor operates one of the non-critical applications when not operating as a backup to the primary processor.

19. An application management system according to claim 18 wherein the applications are associated with different hardware protocols.

20. An application management system according to claim 18 wherein the input is prioritized according to which of the sensors is used as the input.

21. An application management system according to claim 18 wherein the input is prioritized according to a type of input associated with the data or messages.

22. An application management system according to claim 18 wherein the executive cannot be manipulated by the applications.

23. An application management system according to claim 18 wherein the executive controls the exchange of data and messages between processors and further controls when the applications are initiated by the processors.

24. An application management system according to claim 18 wherein the executive initiates one or more of the processors in a lock-step mode.

25. An application management system according to claim 24 wherein the lock-step mode is used to determine a system failure or a sequence of events.

26. An application management system according to claim 25 wherein the lock-step mode is used for automotive accident reconstruction or system diagnostics.

27. An application management system according to claim 18 wherein the executive controls the order that messages are received and transmitted by the applications.

28. An application management system according to claim 27 wherein the messages have associated priorities that identify critical and non-critical vehicle operations, the executive processing the data and messages according to the associated priorities.

29. A method for configuring real-time vehicle applications in a distributed multi-processor system operating in a vehicle, comprising:
   identifying vehicle applications running on different processors in the multiprocessor system;
   operating a task manager that obtains different data and state information associated with the different vehicle applications;
   operating a configuration manager that notifies the task manager upon detecting a failure running one of the identified vehicle applications in the multiprocessor system;
   using the task manager for automatically identifying another processor in the multiprocessor system for running the identified vehicle application and redirecting the vehicle application associated with the detected failure to the other identified processor in the vehicle;
   using the configuration manager to redirect the data and state information to the other identified processor in the vehicle after detecting the failure; and
   initiating the identified application in the identified other processor.

30. A method according to claim 29 including replacing one or more of the vehicle applications successfully running in the multiprocessor system with the identified application when there is no extra processing capacity in the multiprocessing system for running the identified application in another processor.

31. A method according to claim 30 including identifying critical and non-critical vehicle applications running in the multiprocessor system and replacing one of the identified non-critical vehicle applications with the identified application.

32. A method according to claim 29 including:
   identifying a new device that is not currently coupled to the multiprocessor system;
   coupling the new device to the multiprocessor system when output signals from the new device conform to a communication protocol used in the multiprocessor system;
   detecting new vehicle applications running on the new device; and
   adding the new vehicle applications running on the new device to a stored list of all applications running in the multiprocessor system.

33. A method according to claim 32 including:
   identifying a data type used by the new device;
   identifying output devices in the multiprocessor system that uses the same data type;
   displaying on a graphical interface the new device and the identified output devices; and
   outputting data from the new device to the output devices selected on the graphical interface.

34. A method according to claim 29 including:
   identifying a failed vehicle application to a car operator;
   identifying non-critical vehicle applications that can be replaced by the failed vehicle application;
   detecting one of the non-critical vehicle applications selected by a car operator;
   replacing the selected non-critical vehicle application with a copy of the failed application; and
   running the copy of the failed vehicle application.

35. A method according to claim 29 including:
   storing a critical vehicle application in memory;
   storing data generated by the critical vehicle application in memory; and
   downloading the stored critical vehicle application and the stored critical data to another processor when the vehicle application fails.

36. A method according to claim 29 including:
   moving a portable transmitting device within communication range of the multi-processor system;
   detecting a protocol used by the portable device;
   automatically configuring the portable device into the multiprocessor system when the protocol conforms with one of the protocols used in the multiprocessor system;
   displaying an application running on the portable device from an in-dash display coupled to the multiprocessor system; and
   operating the application on the portable device from the in-dash display.

37. A method according to claim 36 including using different wireless and hardwired communication protocols to communicate between different processors in the multi-processor system.

38. A method according to claim 37 including controlling car braking, car airbag deployment, car sensor monitoring, and car audio processing with the multiprocessing system.

39. A method for operating multiple processors in a vehicle, comprising:
   operating a task manager that obtains different Global Positioning System (GPS) data from a first processor operating a GPS application and obtains sensor fusion data from one or more second processors operating sensor applications;
   operating a configuration manager that detects failure of the GPS application operating in the first processor or failure of the sensor applications operating in the second processors, the configuration manager notifying the task manager of the detected failure and the task manager redirecting the GPS or sensor applications associated with the detected failure to a third processor in the vehicle;

operating a critical data manager that manages the storage of data and state information from the GPS and sensor applications; and using the configuration manager to redirect the stored data and state information to the GPS or sensor applications operating on the third processor after a detected failure on the first or second processors.

40. The method according to claim 39 including:

operating a message manager that determines a priority for messages containing the data and state information associated with the GPS and sensor applications; and transferring the messages between the first, second and third processors according to the determined priority.

\* \* \* \* \*

UNITED STATES PATENT AND TRADEMARK OFFICE
Certificate

Patent No. 7,178,049 B2                                                                                     Patented: February 13, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert Pierce Lutter, Tacoma, WA (US); and Dan Alan Preston, Bainbridge Island, WA (US).

Signed and Sealed this Twenty-ninth Day of April 2014.

<div style="text-align:right">

SCOTT BADERMAN
*Supervisory Patent Examiner*
Art Unit 2114
Technology Center 2100

</div>